(12) United States Patent
Lvovskiy et al.

(10) Patent No.: US 10,884,245 B2
(45) Date of Patent: Jan. 5, 2021

(54) COLLIMATING DISPLAY SYSTEM FOR MOTORCYCLISTS

(71) Applicants: Matvey Lvovskiy, New York, NY (US); Aleksandr Efros, Sankt-Peterburg (RU); Artem Goldman, Saarbruecken (DE)

(72) Inventors: Matvey Lvovskiy, New York, NY (US); Aleksandr Efros, Sankt-Peterburg (RU); Artem Goldman, Saarbruecken (DE)

(73) Assignee: EOS HOLDING GMBH, Neunkirchen (DE)

( * ) Notice: Subject to any disclaimer, the term of this patent is extended or adjusted under 35 U.S.C. 154(b) by 0 days.

(21) Appl. No.: 16/406,279

(22) Filed: May 8, 2019

(65) Prior Publication Data
US 2020/0355920 A1  Nov. 12, 2020

(51) Int. Cl.
*G02B 27/01* (2006.01)
*G09G 3/00* (2006.01)
*A42B 3/30* (2006.01)

(52) U.S. Cl.
CPC ............ *G02B 27/0172* (2013.01); *A42B 3/30* (2013.01); *G09G 3/002* (2013.01); *G02B 2027/0118* (2013.01); *G02B 2027/0138* (2013.01); *G09G 2360/144* (2013.01); *G09G 2370/16* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 5,771,497 A | | 6/1998 | Steele | |
| 5,822,126 A | * | 10/1998 | Cursolle | A42B 3/042 359/630 |
| 5,844,540 A | * | 12/1998 | Terasaki | G09G 3/3406 345/102 |
| 7,982,959 B1 | * | 7/2011 | Lvovskiy | G02B 27/01 359/630 |
| 9,414,634 B2 | | 8/2016 | Gindin | |

(Continued)

FOREIGN PATENT DOCUMENTS

WO    WO-2018123057 A1 *  7/2018  ............... G08G 1/00

*Primary Examiner* — Christopher R Lamb
(74) *Attorney, Agent, or Firm* — Yefim Kreydin

(57) ABSTRACT

A display system providing in the motorcyclist's field of view all required visual information in form of the image projected into optical infinity in traffic direction, realized by using located in the motorcyclist's helmet the autonomous optoelectronic system including the display module comprising: the light-emitting micro display, the collimating lens, the flat semitransparent reflector, fixed on the lens case and located in front of the motorcyclist's eye so that to observe the luminous informational image projected into optical infinity against the external situation picture background. Said reflector is movably mounted in two positions: working and distant from the face. The lens assembly including the micro display and bracket with the reflector is equipped with an adjustment bracket allowing to place it in front of right or left motorcyclist's eye. A camera and a photo sensor measuring the background brightness are mounted on the helmet body.

10 Claims, 3 Drawing Sheets

(56) References Cited

U.S. PATENT DOCUMENTS

| | | | |
|---|---|---|---|
| 10,095,034 B1* | 10/2018 | Rodriguez, II | G02B 27/0172 |
| 10,098,401 B2 | 10/2018 | Weller | |
| 10,182,606 B2 | 1/2019 | Tal | |
| 10,573,271 B1 | 2/2020 | Lvovskiy et al. | |
| 2014/0139407 A1* | 5/2014 | Abdollahi | G02B 27/0149 |
| | | | 345/8 |
| 2014/0152252 A1* | 6/2014 | Wood | H02J 50/10 |
| | | | 320/108 |
| 2015/0338659 A1* | 11/2015 | Gallery | A42B 3/042 |
| | | | 345/8 |
| 2016/0037849 A1* | 2/2016 | Shearman | A42B 3/0426 |
| | | | 2/424 |
| 2016/0044276 A1* | 2/2016 | Shearman | A42B 3/0426 |
| | | | 348/207.1 |
| 2017/0115487 A1* | 4/2017 | Travis | G02B 27/0172 |
| 2019/0377961 A1* | 12/2019 | Inai | G01C 21/3697 |

* cited by examiner

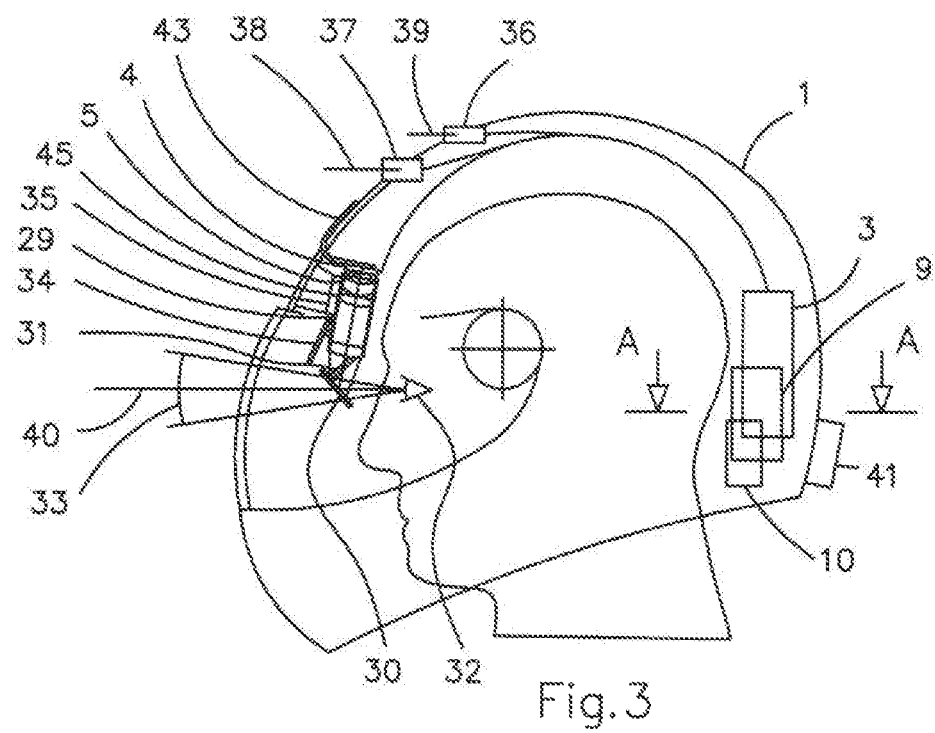
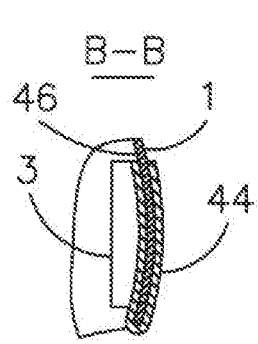
Fig.3B
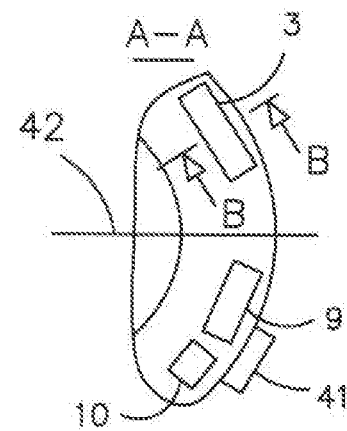
Fig.3A
Fig.3

COLLIMATING DISPLAY SYSTEM FOR MOTORCYCLISTS

BACKGROUND OF THE INVENTION

Proposed display system is designed to display full required volume of visual information in form of collimated, i.e, projected into optical infinity, image in the field of view of the motorcyclist in traffic direction while driving and maneuvering. Due to this the driver does not need to turn his head when using side rear-view mirrors or taking readings from the sensors located on the motorcycle dashboard and therefore losing visual control of the road. Even a short-term loss of visual control of the road is risky for the driver. The reconfiguring of visual apparatus when changing direction of sight from the road to the rear-view mirrors or sensors located on the dashboard is also potential security risk for driving. In both cases vision adaptation and accommodation are changing and as it takes some time even experienced driver may be mistaken in assessing the actual traffic situation during this time.

Currently there are motorcycle helmets equipped with various optoelectronic components that provide the driver with additional visual information when driving. Described in the U.S. Pat. No. 5,771,497 a motorcycle helmet is provided with an additional optical channel located in upper helmet part and intended to watch rear hemisphere. This helmet design has significant drawback: to watch a rear hemisphere picture the motorcyclist has to look at the upper part of the helmet and since at this time he loses eye contact with the road and his visual apparatus is being reconfigured the dangerous consequences are possible. The helmet by U.S. Pat. No. 9,414,634B2 has a video camera installed at its rear part providing a rear view of the road thus facilitating the driving of the motorcycle. But since the video camera is located on the human head, i.e., on a movable platform, it is necessary to take into account anatomical data such as height, arm length and also a habitual manner of sitting on the motorcycle when driving. It is highly probable that under certain manner of sitting on the motorcycle the video camera optical axis is being deviated in relation to the horizontal and the driver will be able to see only a part of required rear view picture and that is risky when maneuvering. This is a significant drawback of the proposed technical solution. The technical solution by U.S. Pat. No. 10,098,401, in accordance with which the helmet is equipped with the installed in it display of Head-up type-HUD, is the most close to the proposed in present Application for patent technical solution by the structure and parameters. Located in frontal lower part of the helmet on inner side of a protecting the chin partition-chin bar the display makes it possible for the driver to watch focused in optical infinity image of various visual information within the area located lower than transparent helmet visor. The main disadvantage of this technical solution is small size of the angular field of view of the display system caused by small linear dimensions of the display that should fit in a confined space between the motorcyclist's chin and the helmet's chin bar. Another significant drawback is that the visual information picture is located below the external viewing area seen by the motorcyclist through the transparent visor. In this case the motorcyclist is unable to observe the visual information picture against the external space background in real-time mode and he has to change his sight direction every time from external space picture to the visual information picture and vice versa, as a result, temporary losing eye contact with the road that seriously complicates driving and adversely affects safety when increasing the motorcycle speed. Also it is important to note the following statement given in the U.S. Pat. No. 10,098, 401, see col. 6, lines 39-43:

"For example, although in the illustrative embodiment display device 24 is not a heads-up-display, use of a heads-up-display with combination with the other features of the present invention is considered within the scope of the invention"

This is a groundless statement since said invention lacks the main fundamental feature of the HUD-type display: providing the capability to see both the ambient space picture and collimated into optical infinity image of visual informational parametric data in a single angular field of view simultaneously. In addition, by the said patent: installed on the helmet back side the rear view video camera is provided with a robotic mechanism which in accordance with the signals of a gyroscope, located on the helmet, should provide stabilized position of the video camera relative to the ground coordinate system when the driver turns his head. The rear view image is being formed on the above mentioned HUD-type display in response to the video camera signal. The drawback of such technical solution is inevitable lag of video image of the helmet rear hemisphere in relation to the real road situation picture caused by inertia parameters of the mechanical device executing the video camera turning when the motorcyclist turns his head quickly. The U.S. Pat. No. 10,182,606 is also close to the technical solution proposed in this Application for patent by the problems statement in the field of technology for creating helmet-mounted equipment and proposed methods for solving them. This patent discloses various helmet configuration options using a monocular display to form an optical image of the information picture for the helmet owner's eye. At the same time, no one technical solution relating to implementation of design of the specific monocular display is being disclosed. Also, there are no proposals on technical, optical, light and other parameters especially important for the monocular collimating displays, forming the information images in optical infinity against the external situation background. All claims of the U.S. Pat. No. 10,182,606 is related or to the mechanism for mounting the monocular display to the helmet, or the design features of the helmet itself, or connecting the helmet to the mobile devices for military use. In particular, as well as in the above-mentioned U.S. Pat. No. 10,098,401, by this patent it is proposed to locate a video camera on the helmet to watch the rear hemisphere similarly as if using the rear view mirrors and this causes the same shortcomings as those noted above when considering the U.S. Pat. No. 10,098,401.

The purpose of present Application is to eliminate above-stated disadvantages of known technical solutions by use of a proposed helmet-mounted display system for motorcycle drivers consisting of three components: the helmet containing the HUD-type equipment which is adapted for peculiarities of the motorcycle driving, digital wi-fi signals generator and rear hemisphere view system such as TV-camera. The last two components are fixed on the motorcycle body. The equipment located in the motorcyclist helmet provides without the limitation of view of the external space all required visual information including the rear hemisphere image from the wide-angle rear view TV-camera, and readouts of sensors of speed, engine speed, remaining fuel, GPS system, etc., in form of luminous collimated image of information picture, generated within the wide angular field of view against the background of ambient road situation picture in traffic direction. Implementation of this technical solution provides the motorcyclist with capability for driving, including maneuvering when overtaking and changing lanes, without losing the visual contact with the road and needing of readjusting of visual apparatus thus providing significant improvement in driving safety.

Additionally it is offered to install on the upper front part of the helmet a miniature camera with video recording option, intended for photo shooting and video footage of the road situation in the motorcycle's traffic direction, and also a photo sensor of an automatic adjusting system of brightness of formed in the driver's field of view collimated informational image depending on light level of the ambient background against which the driver is viewing said informational image. Also it is offered the following:

to locate on motorcycle steering handles the remote controls with appropriate switching elements allowing the driver to form information picture of optimal type and volume for various driving modes in tactile way;

to install on the motorcycle body a wireless charging device, e.g., by Pi standard, for charging the accumulator located in the helmet and to install inside the helmet or on its outer side a wireless automatic control device switching on or off the charging device depending on the accumulator charge level.

SUMMARY OF THE INVENTION

The display system of HUD-type is installed in the helmet and consists of two components: a display module and a collimating optical system. The display module contains an electronic signal generator and a light emitting micro display, on a screen of which primary image of combined information picture of a certain brightness is formed. The collimating optical system includes a lens and a semitransparent reflector. The micro display screen is combined with the focal plane of the lens which projects the luminous image of the information picture into optical infinity and by use of the semitransparent reflector the driver can see said luminous image of the information picture within the angular field of view of the collimating optical system against the background of the external situation picture in traffic direction. As a result of the joint action of the display module and the collimating optical system the driver is able to see all visual information required for driving without losing of visual contact with the road and without needing of re-accommodation and re-adaptation of visual apparatus.

The display module is provided with a control unit which is a microprocessor supplemented with the elements of ROM and RAM memory and switching. When generating signals, including TV frame and linear scanning, to form the required image within the motorcyclist's optical field of view, order and sequence of operations are provided by a relevant program.

In addition, the control unit provides the automatic adjustment of formed image brightness depending on light level of the ambient external background against which this image has to be seen with optimal contrast. To measure the ambient external background brightness, the photosensor is installed on the upper front helmet part and located in such way that its optical axis is parallel to the line passing through the center of the angular field of view of the collimating optical system. In response to the photosensor signals the control unit provides appropriate adjustment of brightness of formed image of informational picture in real-time mode.

Installed in the upper front helmet part the miniature camera with video recording option is similar to those used in modern smartphones and intended for photo and video recording of the road situation in motorcycle's traffic direction. Herewith the camera is located in such way that its optical axis is parallel to the line passing through the center of the angular field of view of the collimating optical system (with its middle position} and horizontal and vertical axes of video frame of the camera are parallel to the horizonal and vertical axes of the collimated image of the informational picture respectively. If required, in order to provide full-fledged video recording of the motorcycle moving process and functioning of the helmet display system the resulting photo or video of the external situation picture could be superposed with the image of current informational picture formed at the same location and with the same angular parameters as the motorcyclist saw it at the fixed time moment.

Besides the image of the motorcycle moving parameters in symbolic form, located, mostly, in peripheral areas of field of view, the display system provides in specified area of this field of view the TV image from the rear view camera, included into the system, which is switched by the driver at the moment before he takes a decision to start maneuvering, e.g., at overtaking or changing lanes on a highway. Thus, in order to get information about the presence or absence of obstacle there is no need to turn the head at a rather large angle and readjust the visual apparatus. To activate the display system operating mode it is necessary to push a button, located on the steering wheel, and simultaneously the rear view TV camera is being activated and the display module and the whole display system are being switched into combined operating mode. The combined mode allows to sequentially reproduce TV raster during the time within the duration of one frame of standard TV scanning and to carry out the image plotting of the symbolic information by the functional method during the time of "reverse of the beam". Due to low speed this method of image plotting allows to provide the brightness of symbols which is significantly higher than the brightness of external background under sunlight and that is important for improvement of symbols observability against the external background. It should be noted that the frame rate generator is also a regeneration frequency generator while image plotting of the symbols. Due to this, TV frames formation and image plotting of symbols processes are fully synchronized.

Since the proposed system is based on digital methods of input, processing and displaying of information of various types there are no any technical or technology limitations for number of displayed parameters and their location within the display system field of view. The choice depends on the results of engineering and psychological studies, taking into account ergonomics and testing on simulators. Nevertheless several parameters have to be displayed: speed, engine speed, fuel volume, roll angle—real-time motorcycle lateral angle of inclination relative to its longitudinal axis—with indication of limit values of this angles, with which the motorcycle may tip over at sharp turn when moving at a given speed. Therefore, there have to be provided the digital sensors of listed parameters, the output data from which are entered to a digital generator of wi-fi signals by USB serial interface. Since wireless link between the electronic apparatus, located in the helmet, and the symbols generator is carried out by use of wi-fi technology special wi-fi signals generator is installed on the motorcycle body and connected with the accumulator of the motorcycle.

Wireless recharging of the located in the helmet accumulator, e.g., by Pi standard, is provided in the suggested display system. For this the charging device is installed on the motorcycle body at a rather close distance relative to location of the driver's head and the wireless automatic control device, switching on or off the charging device depending on the accumulator charge level, is installed inside the helmet or on its outer side.

The rear view is provided by TV camera. A terrain and road traffic situation picture is captured by the camera in TV standard in real-time mode and displayed within the collimating optical system field of view simultaneously with the symbolic information picture in form of projected into optical infinity single luminous informational picture against the background of the image of external situation in motorcycle's traffic direction. The TV camera is installed on a strong telescopic bar, fixed in the rear part of the motorcycle behind the passenger seat. The TV camera is provided with wide-angle optics, allowing to see several lanes on both sides of a multi-lane highway. In principle, the wider the viewing angle the more safe maneuvering is provided when changing lanes or overtaking.

Proposed and briefly described helmet-mounted display system allows to improve the driving and maneuvering safety under any road-traffic situation by integrating all required information within the frontal field of view and due to this there is no need for the driver to turn his head and neither re-adaptation nor re-accommodation of visual apparatus is required.

BRIEF DESCRIPTION OF THE DRAWINGS

FIG. 3 Layout scheme embodiment of the helmet with the elements of the display system;
  FIG. 3A shows the section A-A, FIG. 3
  FIG. 3B shows the section B-B, FIG. 3.

DETAILED DESCRIPTION OF PREFERRED EMBODIMENT OF THE INVENTION

Figure 1A:
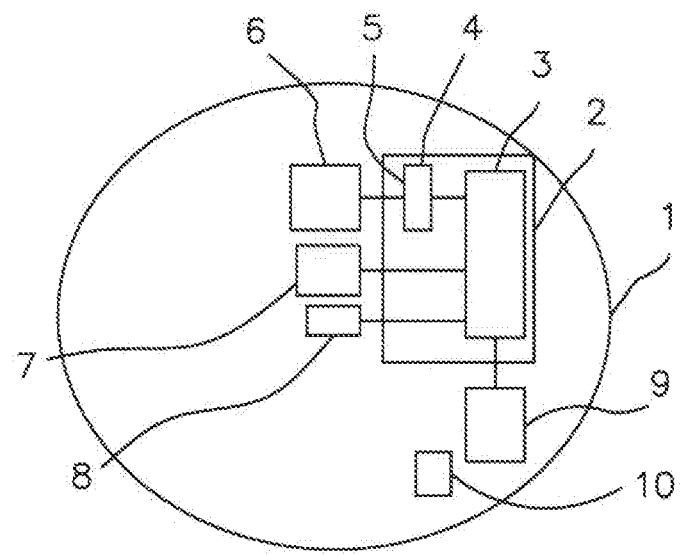
FIG. 1A and FIG. 1B show functional scheme of the system.
Figure 1B:
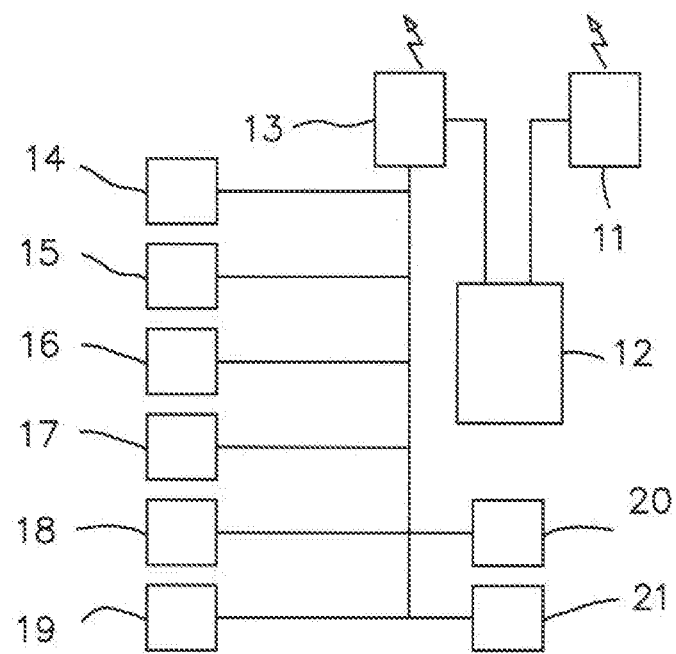

FIG. 1A and FIG. 1B show the functional scheme of the proposed display system. The display system includes the helmet 1 with located in it display module 2, containing an electronic control unit—microprocessor 3 and a light-emitting micro display 4, e.g., OLED, on a screen 5 of which the primary informational image of specified brightness is formed, and a collimating optical system 6, projecting said informational image into optical infinity and providing for the driver ability to see it against the external situation picture background without re-accommodation and re-adaptation of visual apparatus needing. The miniature photo camera 7 intended for photographic recording of the external situation in traffic direction and the photosensor 8 for measuring of brightness of the ambient external background in frontal hemisphere are installed on the helmet and connected to the microprocessor 3. Power supply of the display module 2 is provided by located in the helmet accumulator 9. The accumulator 9 is connected to the wireless automatic control device 10, which, depending on charge level of the accumulator 9, is switching on or off the wireless charging device 11, located on the motorcycle body and connected to its' accumulator 12. FIG. 3 shows two placement options for specified wireless automatic control device 10.

Wireless connecting of the display module to appropriate sensors of input and control signals is provided by wi-fi technology using a digital wi-fi signal generator 13, located on the motorcycle body. Power supply of the digital generator 13 is carried out by the motorcycle accumulator 12 also. Connected to the digital generator 13 via serial interface USB, the sensors of displayed informational parameters and data of controls include, e.g., the following:
  rear-view TV camera 14,
  speedometer 15,
  engine speed sensor 16,
  fuel sensor 17,
  real-time roll angle sensor 18,
  GPS receiver 19,
  control panel, located on the left handlebar of the motorcycle 20,
  control panel, located on the right handlebar of the motorcycle 21.

The list of displayed information parameters, including text, warning and reference information, can be changed or supplemented. At the same time type, size and location within the display system field of view of above informational images are entered into a program of the microprocessor 3 in advance. It should be noted that several sensors can be placed in the wi-fi signal generator 13 and integrated into it. To operatively manage volume and content of the information picture, formed by the display system, the following embodiment is suggested: to install on the left and right steering handles of the motorcycle the remote controls provided with appropriate switching elements, e.g., round or square buttons, that allows the driver in tactile way both to input the required informational parameters in the field of view and disable unnecessary ones when driving a motorcycle in various modes. To decrease the number of switching elements, located on the remote controls, some buttons are multifunctional depending on various types of pressing, e.g., a single short or long press of the button or consecutive short pressing of one button several times provide the execution of the corresponding functions of the display system. To discern the buttons from one another they are painted in different colors and illuminated under night conditions in different way. At the same time, the most frequently used buttons are located on the remote controls in more accessible for the fingers places.

To provide operational control of the volume and content of the information picture image generated by the display system, other options are possible to be used. For example, it is possible to use voice control with voice commands in form of single words or phrases pronounced by the driver. In this case, the main condition is to have access to the Internet connection. By use of this voice commands the algorithms are entered that set operations required to control the volume and content of the information picture formed by the display system. The commands and response algorithms are pre-entered to the software of the system.

Figure 2A:
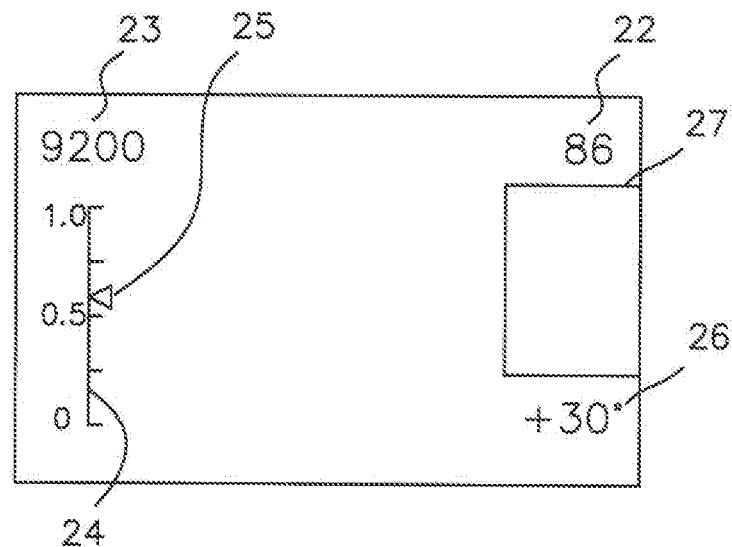
FIGS. 2A and 2B show variants of information pictures observed by the motorcyclist within the angular field of view of the display system under two operating modes:
  rear view TV camerba is switched off—FIG. 2A,
  rear view TV camera is switched on—FIG. 2B.
Figure 2B:
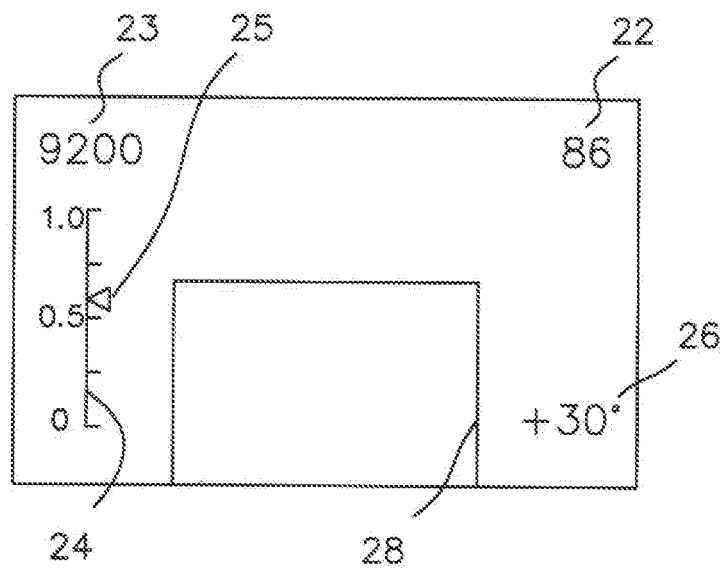

FIG. 2 shows the information pictures viewed by the motorcyclist within the angular field of view of the display system under two operating modes:
  rear view TV camera is switched off, FIG. 2A;
  rear view TV camera is switched on, FIG. 2B.

When the TV camera is switched off, FIG. 2A, a speed indicator 22 (sensor 15) and engine speed indicator 23 (sensor 16) are depicted as numerals and located in upper peripheral parts of the angular field of view. In this case they occupy minimal part of the angular field of view and do not obscure the central area. It is preferable to locate the fuel indicator under the engine speed indicator in the left part of the field of view. It can be carried out in form of linear digitalized scale 24 with the movable index 25 (sensor 17), indicating the level of fuel in the tank of the motorcycle. The indicator of roll angle 26 (sensor 18) can be represented by numerical value and a sign of the roll angle in the right lower part of the field of view and the GPS data 27 (sensor 19) is located between the indicators of roll angle 26 and speed 22. When the TV camera is being switched on, FIG. 2B, the rear view TV image 28 is appearing in the lower part of the field of view and GPS data (see FIG. 2A, p.27) is being switched off temporarily. It should be noted that if there is an angle of roll 26 currently then the TV image in the field of view of the display system is being turned by use of the software at the same angle in such way that the driver is perceiving the rear view without the roll relative to the road in motorcycle's traffic direction.

The FIG. 3 shows the layout embodiment for the helmet with the elements of the display system. The collimating optical system 6 (shown conditionally at the FIG. 1) contains a collimating lens 29 and a flat semitransparent reflector 30. A micro display 4 is installed on a case of the collimating lens 29 in such way that the screen 5 of the micro display is combined with the focal plane of the lens, which projects the luminous image from the screen 5 into optical infinity. The semitransparent reflector 30 is attached to the case of the lens 29 with a bracket 31 and located in front of the driver's eye 32 so that the driver is able to watch within the angular field of view 33 of the collimating optical system projected into optical infinity luminous informational image against the background of external situation picture in traffic direction. The dimensions of the reflector 30 on horizontal and vertical are not exceeding 25 mm with thickness 2 mm. At the same time, the angular field of view 33 of the display system is not less than 15 ? vertically and 20 ? horizontally. The display system design provides the ability to move the bracket 31 with the reflector 30 at a remote distance 34 from the driver's face by switching to the off-position both before putting on and before removing the helmet, that simplifies the helmet using and reduces the risks of injury for the driver and damage of the reflector.

The lens 29 is fixed on the helmet 1 housing by an adjusting bracket 35 at a safe distance from the driver's eye 32. The design of the bracket 35 provides the following capabilities:

to place the lens 29 module (with fixed on it micro display 4, the reflector 30 and the bracket 31) in front of the driver's right or left eye as preferred;

to carry out individual adjusting of the lens 29 module (with fixed on it micro display 4, the reflector 30 and the bracket 31) for each driver required for comfortable viewing of full informational picture formed by the helmet-mounted display system.

To carry out measurement of brightness of ambient background the photosensor 36 is located on the upper frontal part of the helmet in response of the signals of which the microprocessor 3 fulfills in real-time mode the appropriate adjusting of brightness of formed image of informational picture providing optimal image contrast against the ambient background under which the comfort perceiving is ensured for both the luminous informational picture and the external situation picture. To carry out photo shooting and video recording of road situation picture in the motorcycle's traffic direction a miniature camera 37 is installed on the frontal upper part of the helmet and provided with video recording option (similar to that used in modern smartphones). The photosensor 36 and the camera 37 are located in such way that an optical axis 38 of the camera and an optical axis of the photosensor are parallel to the line 40 passing through the center of the angular field of view 33 of the collimating optical system and horizontal and vertical of the video frame of the camera 37 are located parallel to the horizontal and vertical of the informational picture.

If required, to provide the complete video registration of the motorcycle's moving process and the helmet-mounted display system functioning the real-time informational picture can be superposed to the photo image or video footage of the external situation picture that was fixed in the same place and with the same angular dimensions as it was observed by the driver at the same fixed time moment.

The helmet-mounted display system for the motorcycle works as follows: the current input data from the respective sensors and controls (14-21) are fed to the microprocessor 3 (FIG. 1) via the Wi-Fi communication channel. In accordance with the program symbolic graphical information is plotted during the time of "revers of the beam" which is equal to several milliseconds depending on selected TV standard, the signals, generated by the microprocessor 3, enter the micro display 4, which forms on the screen 5 corresponding primary image of the information picture of a certain brightness taking into account the signal from the photosensor 38. Since the volume of graphical symbolic information from the sensors 14-19 is small the image plotting can be carried out by functional method, allowing to reduce the speed of image plotting and due to this get more higher brightness of symbols image under conditions of high brightness of the external background. This is especially important because the brightness of the symbolic images of said parameters should be high enough to provide their confident readability under any ambient light conditions. Formed on the screen 5 by use of the projecting lens 29 and the semitransparent reflector 30, the luminous image is projected into optical infinity in the motorcycle traffic direction and is observed by the motorcyclist within the angular field of view 33 of the collimating optical system against the external situation picture without needing of re-accommodation and re-adaptation of vision.

The microprocessor 3 and the accumulator 9 are the most bulky elements of the helmet-mounted display system. To improve balancing of the helmet this elements are installed at the lower rear part of the helmet left and right relative to the helmet plane of symmetry 42 as it is shown at FIG. 3 A, section A-A. Since the micro display 4 and the microprocessor 3 are being heated while operating, they are provided with the radiators 43 and 44, carried out of pure aluminum with the best thermal conductivity per unit of mass. The radiator 43 is fixed on the upper outer area of the helmet by use of screws or glue and connected with the micro display 4 by use of flexible thermally conductive material. The radiator 44 is fixed on the rear outer area of the helmet by use of screws or glue, as shown at FIG. 3B, section B-B, and connected with the microprocessor 3 by use of the same flexible thermally conductive material. The radiators 43 and 44 collect the heat from the micro display 4 and microprocessor 3 respectively and disperse it into the surrounding atmosphere by blowing the helmet with an air stream when the motorcycle is moving.

Advantages of the Invention

Ensuring safe motorcycle riding is still a relevant problem currently. Accordingly, there is a need to search and develop new technical and technological solutions. Growing popularity of high-speed motorcycles of medium and high power and soaring traffic cause an increase in crash rates among the motorcyclists. Another reason is the lack of awareness of the motorcyclist in a changing real traffic situation, especially when maneuvering. In this case a dangerous situation occurs because visual contact with the road is being interrupted. The same situation occurs when the motorcyclist is taking readings from the speedometer or the fuel sensor, which are located on the dashboard. Since the proposed helmet-mounted display system provide the motorcyclist with more complete information about the current real traffic situation he does not need to turn his head towards the side rear-view mirrors or interrupt visual contacting with a front view area while taking readings from the speedometer or fuel sensor, etc. Moreover, in such cases there is no problem of re-accommodation and re-adaptation of the motorcyclist's visual apparatus. Thus, the application of the proposed helmet-mounted display system helps to improve driving safety and reduce accidents involving the motorcyclists.

To implement the suggested helmet, equipped with the collimating display system, the most rational design scheme has been developed, given that the inclusion of any additional elements in the design of the helmet leads to an increase in its weight and dimensions causing inconveniences for a helmet wearer and increase of production costs. Unlike the helmet by U.S. Pat. No. 10,098,401B2 the proposed helmet design does not include:

rear view TV camera with appropriate fixing elements and device for stabilizing its' spatial position;

air turbine and located in the helmet upper part special air channel with located in it a turbo-generator, intended to recharge the accumulator battery, which is switchable to fan mode to cool the accumulator battery and also the driver/s head in hot weather;

signaling elements located on the helmet housing, since using the proposed collimating display system the required signaling information is displayed directly in front field of view of the motorcyclist.

Thus, no one of the above listed features is not present in the proposed helmet-mounted display system. It was noted above that according to the statement of the authors of the patent U.S. Pat. No. 10,098,401 the helmet by said patent is not a HUD. whereas the proposed helmet-mounted display system is based precisely on principles of the HUD build-up being adapted to the specifics of driving a motorcycle. At the same time it should be noted that the helmet has a special device designed to ensure safety of the motorcyclist when putting on or removing the helmet, as well as to avoid damage to internal equipment of the helmet itself. The system according to U.S. Pat. No. 10,098,401 patent lacks such important components available in the proposed system as a camera and a photo sensor, measuring the external background brightness, significantly expanding the capabilities of the proposed system by providing full photo and video recording of current events, as well as performing automatic brightness control to achieve a comfortable image contrast. Some of the listed criticisms also relate to the helmet by the U.S. Pat. No. 10,182,606 patent. Some important aspects are not taken into account in said patent, e.g., such as the following: what is the technical solution of the design used to ensure the wearer's safety when putting on and removing the helmet. In addition:

the frame construction, proposed in the patent for attaching the monocular display to the helmet, will significantly worsen the view of the external space, inevitably causing decreased safety both for the helmet wearer and for the surrounding participants of traffic;

the helmet by said patent, connected with the on-board devices and power supply by the cable, practically cannot be applied for the motorcycle driving for basic safety reasons because under accidentally falling from the motorcycle, even with not high speed driving, the driver, "fastened" to the motorcycle by the cable, can get a severely injury to the cervical spine with loss of consciousness and even fatal.

Cooling of the heat emitting devices is carried out by use of the radiators. In nearest future due to the transition to a higher-level 7$nm$ chip integration technology the power consumption and heat emission will decrease significantly and that will improve thermal conditions inside the helmet. Charging of the battery located in the helmet is carried out from the charging device, e.g., by Pi standard type, from the motorcycle power supply Due to significant progress in the field of electronics, the prerequisites are created for increasing the range of the charger.

Being the most affordable and wide applied component the TV camera is used in the proposed system to provide the rear hemisphere view and located on the motorcycle body. At the same time in some cases special purpose motorcycles must be equipped with a viewing system with night vision option. In this case it is necessary to use a low-level TV system instead of conventional TV camera or introduce a special night vision channel in addition to the TV camera. In above case it is practically impossible to mount such systems directly on the helmet.

In the proposed system to avoid blinding the motorcyclist due to high ambient light the helmet is equipped with a movable visor similar to available ones and made of organic glass of neutral color with specified transparency coefficient. A similar visor can be made of transparent organic glass with a photochromic coating, which automatically adjusts the light transmission from the external space.

The proposed system can be used for other human controlled vehicles of various purposes.

What is claimed is:

1. A collimating display system for motorcyclists, the system comprising:
   a helmet,
   a Head Up Display apparatus located inside the helmet, said apparatus comprising
   a microprocessor and
   a display module, said display module comprising
   a collimating optical system with a lens,
   a flat semitransparent reflector, and
   a light-emitting micro display providing full volume of visual information required for driving a motorcycle in a form of a luminous image projected into optical infinity,
   an accumulator,
   a photo camera to provide photo registration,
   a photo-sensor provided to measure brightness of the ambient external background; and
   a Wi-Fi signal digital generator, and
   a TV camera directed to a rear hemisphere,
   the Wi-Fi signal digital generator and the TV camera mounted directly on a body of the motorcycle:
   wherein the light-emitting micro display is connected with the microprocessor,
   the microprocessor is provided with software;
   the flat semitransparent reflector is coupled to the collimating optical system; and
   the flat semitransparent reflector's location is adjustable relative to the collimating lens;
   the flat semitransparent reflector is directly optically coupled to the lens and located in front of one of motorcyclist's eves, allowing him to observe the luminous image, projected into optical infinity against a background of an external space in a direction of movement of the motorcycle within a full angular field of view of the collimating optical system;

wherein angular dimensions of the luminous image are equal to the full angular field of view of the collimating optical system at a distance to the motorcyclist's eye; and the collimating optical system is designed so that the light-emitting display screen is located in a focal plane of the lens, said lens projecting the luminous image from the screen into optical infinity;

wherein all motion parameters and systems status of the motorcycle are displayed on the periphery of the full angular field of vision, leaving the central part of the angular field of view without uploaded graphical information to monitor the road, on the background of the external environment in the direction of movement of the motorcycle, and wherein said TV camera generates visual information about an external situation in the rear hemisphere, in the form of a collimated image of luminous information pictures in a lower part of the wide-angle field of view of the collimator optical system.

2. The collimating display system of claim 1, wherein the photo camera for video registration is installed on the helmet in such way that an optical axis of the photo camera is parallel to a line passing through a center of an angular field of view of the collimating optical system, and horizontal and vertical borders of a video frame of the photo camera are oriented parallel to the horizontal and vertical borders of the image, projected into optical infinity image of the informational picture.

3. The collimating display system of claim 2, wherein the photo camera provides ability to combine the photo of the external situation in traffic direction with the image of current information at the same place and with the same angular dimensions when viewed by the motorcyclist at a fixed time moment.

4. The collimating display system of claim 1, wherein the photosensor is located in the helmet in such way that an optical axis of the photosensor is parallel to the line passing through the center of angular field of view of the collimating optical system, and a brightness of the external background is measured in the direction of a gaze of the motorcyclist;

and wherein the photosensor is connected to the microprocessor to automatically adjust the brightness of the image of information symbols depending on the brightness level of the external background to ensure optimal brightness contrast of the specified image of information symbols.

5. The collimating display system of claim 1, wherein the reflector is movable allowing to locate the reflector in two positions:

working position and non-working position, distant from a driver's face, and wherein the lens is installed on the helmet at a safe distance from the driver's head, in front of the driver's right or left eye and allows to customize the position of the lens for the driver's eye to ensure comfortable viewing of the information picture formed by the helmet display system.

6. The collimating display system of claim 1, wherein the flat semitransparent reflector located in front of the motorcyclist's eye and after reflection from the semitransparent reflector the optical axis of the collimating lens passes through the center of a motorcyclist's eye pupil when the motorcyclist is wearing the helmet.

7. The collimating display system of claim 1, wherein the display module a separate structural unit connected to the processor and accumulator via wired and/or wireless communication.

8. The collimating display system of claim 1, wherein the display module do not extend beyond an external contour of the helmet; microprocessor and accumulator are located in the rear lower part of the helmet and simultaneously are used as balances to ensure that the helmet is balanced when equipped with the device components due to their optimal location relative to the vertical plane of symmetry of the helmet.

9. The collimating display system of claim 8, wherein the flat semitransparent reflector in the display module in the operating position is adjustable of the location relative to the collimating lens and the motorcyclist's eye.

10. The collimating display system of claim 1, wherein the flat semitransparent reflector being installed into two fixed positions: operating position when the motorcyclist can view the collimated image of the information picture within full angular field of view of the display module and non-operating position when the flat semitransparent reflector being installed distant from the motorcyclist's head in order to put on and take off the helmet safely and preserve the reflector from damage.

\* \* \* \* \*

UNITED STATES PATENT AND TRADEMARK OFFICE
CERTIFICATE OF CORRECTION

PATENT NO.         : 10,884,245 B2
APPLICATION NO.    : 16/406279
DATED              : January 5, 2021
INVENTOR(S)        : Matvey Lvovskiy, Aleksandr Efros and Artem Goldman Page 1 of 1

It is certified that error appears in the above-identified patent and that said Letters Patent is hereby corrected as shown below:

In the Specification

Column 7, Line 19: A micro display 4 is installed on a case of the collimating
Should be: A micro display 4 is installed on a case 45 of the collimating Column 7, Line 39: The lens 29 is fixed on the helmet 1 housing by an adjusting
Should be: The lens 29 is fixed on the helmet 1 housing 46 by an adjusting Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*